US005399002A

United States Patent [19]
Taylor

[11] Patent Number: 5,399,002
[45] Date of Patent: Mar. 21, 1995

[54] SECURITY BRAKE SYSTEM

[76] Inventor: Donald M. Taylor, 130 Sass Dr., Goose Creek, S.C. 29445

[21] Appl. No.: 208,288

[22] Filed: Mar. 10, 1994

[51] Int. Cl.$^6$ .............. B60T 17/16; B60T 11/00; B60R 25/00

[52] U.S. Cl. .................. 303/89; 180/287; 188/353; 188/1.11

[58] Field of Search .......... 188/353, 265, 1.11; 303/89; 180/287; 307/10.2, 10.3

[56] References Cited

U.S. PATENT DOCUMENTS

| | | | |
|---|---|---|---|
| 3,298,471 | 1/1967 | Evans | 188/353 |
| 3,559,755 | 2/1971 | Pond | 303/89 X |
| 3,656,574 | 4/1972 | Edwards | 303/89 X |
| 4,546,846 | 10/1985 | Myers | 188/353 X |
| 4,793,661 | 12/1988 | Munro | 188/353 X |
| 4,951,776 | 8/1990 | Jeter | 188/353 X |
| 5,163,741 | 11/1992 | Hsiu | 303/89 |

FOREIGN PATENT DOCUMENTS 2247727  3/1992  United Kingdom ........... 188/353

Primary Examiner—Douglas C. Butler

[57] ABSTRACT

A security brake system comprising a plurality of braking modules, each module coupled between a brake master cylinder and a set of wheel cylinders of a vehicle, each module further comprising a body having a first, second, third ports, and a plurality of channels disposed therein between the ports, the first port allowing the transfer of braking pressure to the body from the brake master cylinder, the second port allowing the transfer of braking pressure from the body to a set of wheel cylinders, the channels transferring brake pressure therethrough between the ports; a valve mechanism coupled to the third port of the body and extended within a channel between the first and second ports for controlling brake pressure between the first and second ports, whereby allowing the brakes of the vehicle to be locked or unlocked; and an activation mechanism for activating the valve mechanism in one orientation, whereby unlocking the brakes of the vehicle, and deactivating the valve mechanism in another orientation, thereby locking the brakes of the vehicle.

2 Claims, 4 Drawing Sheets

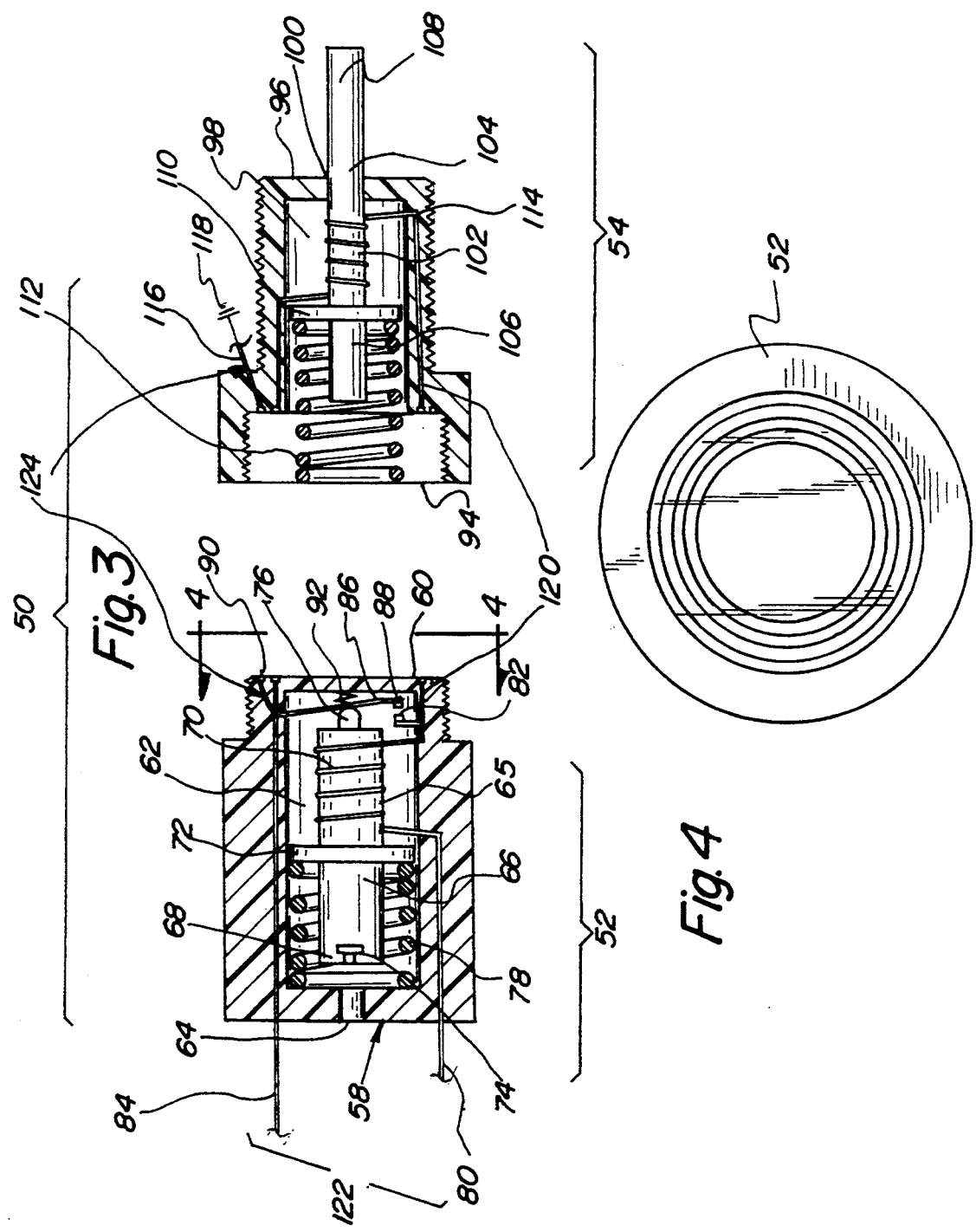

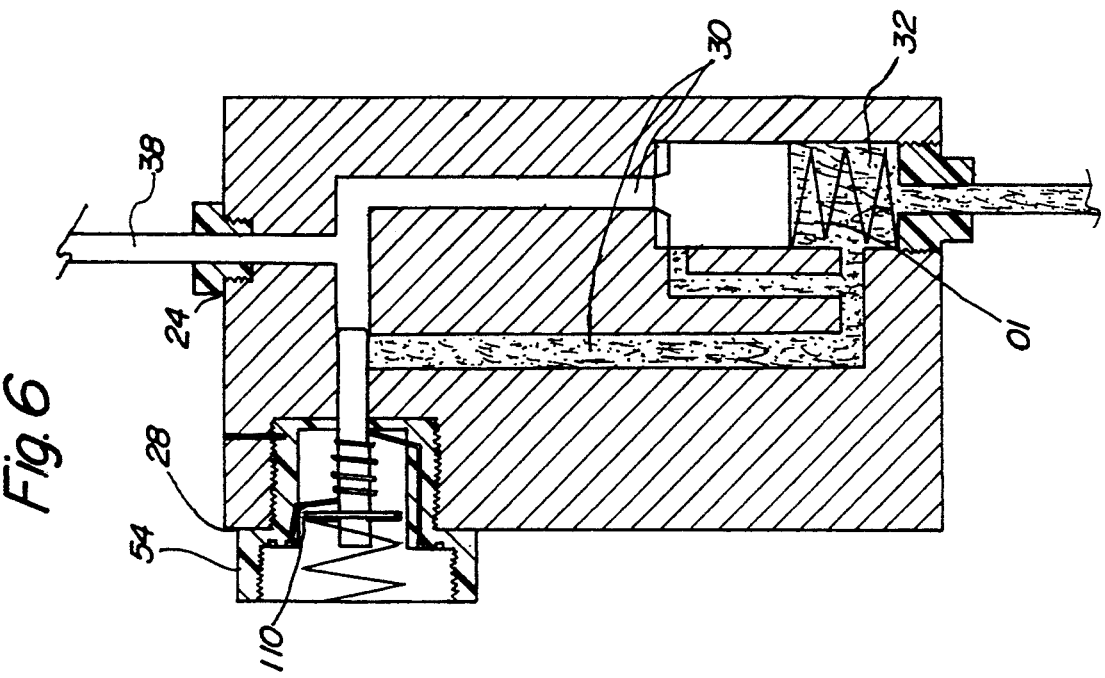
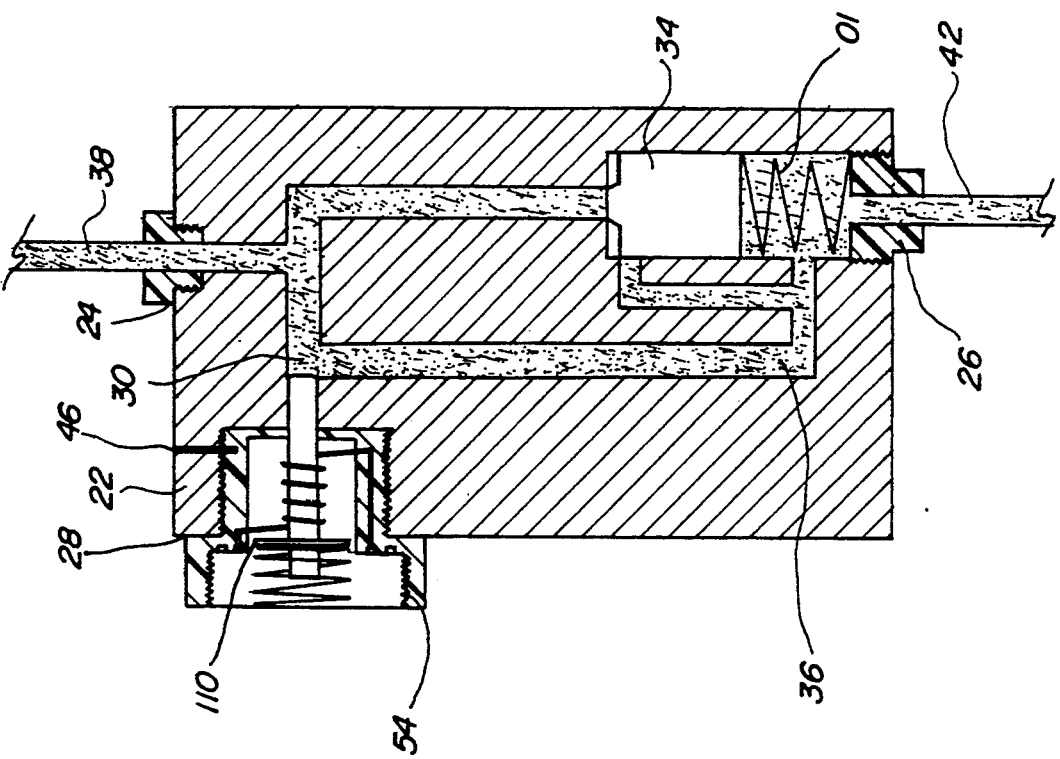

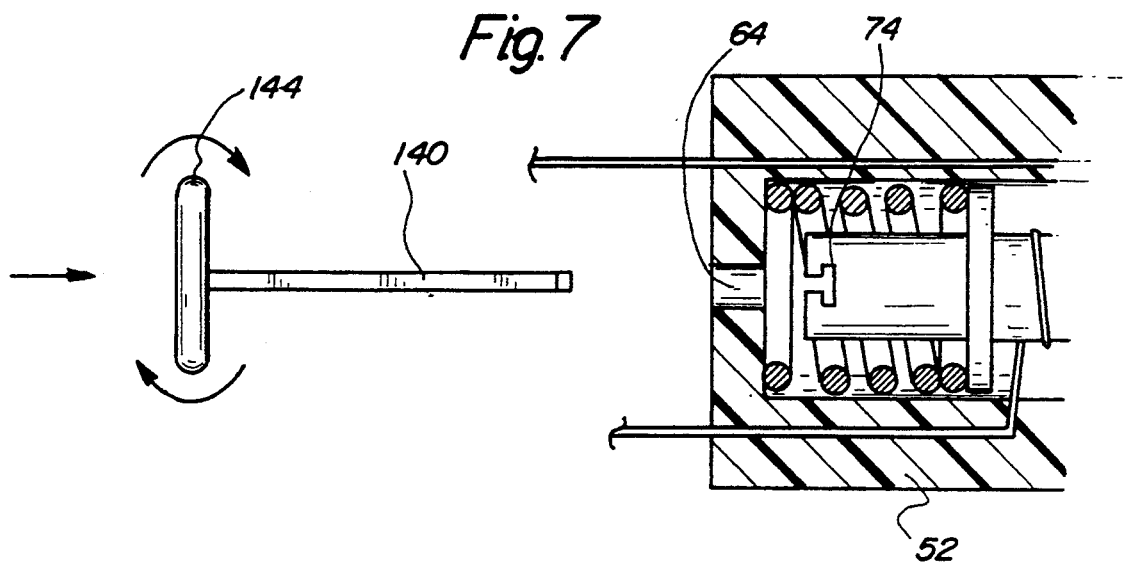
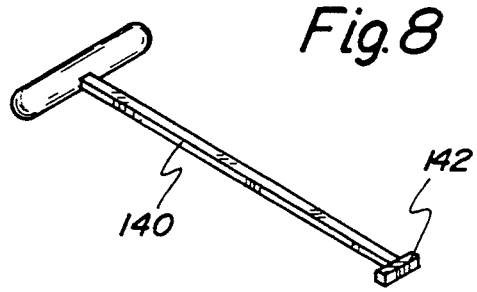
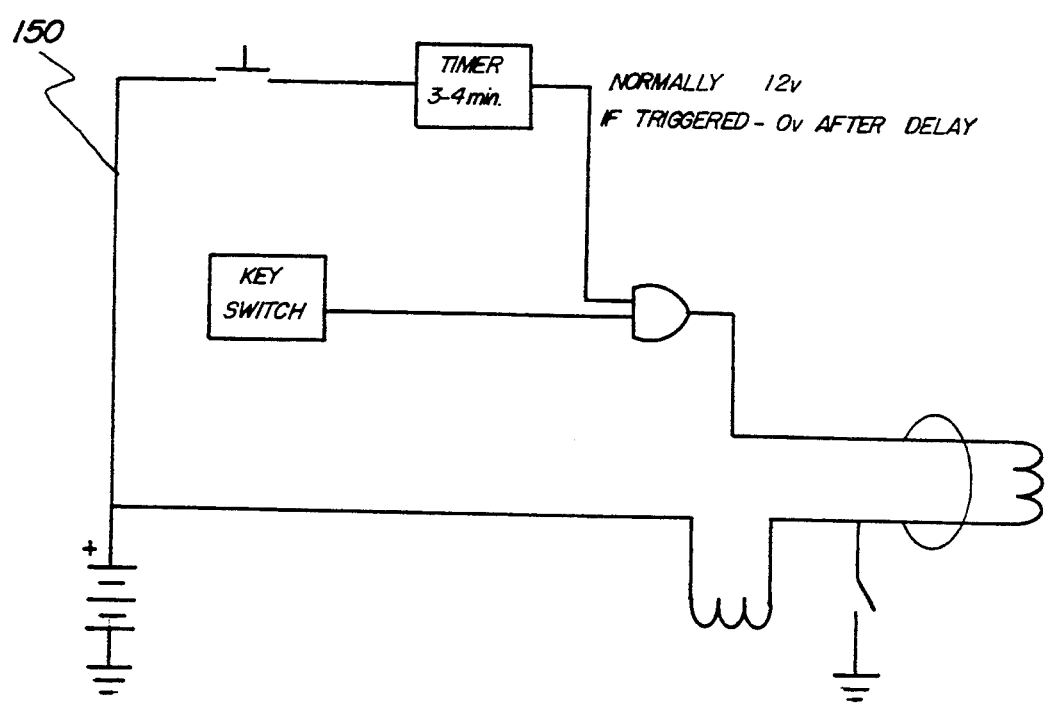

1

SECURITY BRAKE SYSTEM

BACKGROUND OF THE INVENTION

1. Field of the Invention

The present invention relates to a security brake system and more particularly pertains to locking and unlocking the brakes on a vehicle with a security brake system.

2. Description of the Prior Art

The use of security systems is known in the prior art. More specifically, security systems heretofore devised and utilized for the purpose of locking a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,721,192 to Cano et al discloses an anti-theft device for vehicles. U.S. Pat. No. 4,873,824 to Cox discloses a master cylinder pressure-retaining vehicular anti-theft brake locking mechanism. U.S. Pat. No. 4,964,677 to Splinter discloses a vehicle anti-theft system. U.S. Pat. No. 5,001,913 to Gamboni discloses an automotive anti-theft device for brakes. U.S. Pat. No. 5,154,493 to Futrell et al. discloses an anti-theft brake lock. U.S. Pat. No. 5,163,741 to Hsiu discloses a device for hydraulic brake lock valve with a closing piston.

While these devices fulfill their respective, particular objective and requirements, the aforementioned patents do not describe a security brake system that is activated or deactivated with a key or card, uses a solenoid relay-valve mechanism to prevent or allow brake pressure to be delivered to the wheels, and uses a series of one way check valves to trap pressure at the vehicle's wheel cylinders.

In this respect, the security brake system according to the present invention substantially departs from the conventional concepts and designs of the prior art, and in doing so provides an apparatus primarily developed for the purpose of locking and unlocking the brakes on a vehicle.

Therefore, it can be appreciated that there exists a continuing need for new and improved security brake system which can be used for locking and unlocking the brakes on a vehicle. In this regard, the present invention substantially fulfills this need.

SUMMARY OF THE INVENTION

In the view of the foregoing disadvantages inherent in the known types of security systems now present in the prior art, the present invention provides an improved security brake system. As such, the general purpose of the present invention, which will be described subsequently in greater detail, is to provide a new and improved security brake system and method which has all the advantages of the prior art and none of the disadvantages.

To attain this, the present invention essentially comprises, in combination, a first and a second braking module. The first braking module is adapted to be coupled between the brake master cylinder and front set of wheel cylinders of a vehicle. The second braking module is adapted to be coupled between the brake master cylinder and rear set of wheel cylinders of a vehicle. Each module further comprises a rigid body having a threaded first port disposed thereon, a threaded second port disposed thereon, a threaded third port disposed thereon, a plurality of channels disposed therein between the ports with the ports connected at a common juncture, a reservoir formed at the juncture, and a one way check valve disposed within the reservoir, the first port having a first ring threadably coupled therein, the first ring adapted to be connected to a brake line for allowing the transfer of braking pressure from a brake master cylinder, the second port having a second ring threadably coupled therein, the second ring adapted to be connected to a brake line for allowing the transfer of braking pressure to a differential pressure valve that provides braking pressure to a set of wheel cylinders, the third port adapted to receive a solenoid relay-valve therein, the channels and reservoir adapted for transferring brake pressure therethrough to the ports, and the one way check valve adapted for maintaining and controlling the brake pressure within the reservoir. An elongated solenoid relay-valve is included and has a tubular relay section threadably coupled to a tubular valve section, the relay section adapted to be coupled to a power source, the valve section threadably coupled to the third port of the body and extended within a channel between the first port and the second port, the valve section further adapted to control the brake pressure between the first and second port, whereby allowing the brakes to be locked or unlocked. The relay section has a top end, a sealed bottom end, and a hollow core therebetween, an access hole disposed on the top end of the relay section for allowing access to the core, a first solenoid slidably disposed therein, the first solenoid including a first rod having a first end, a second end, and an outwardly extending intermediate portion therebetween, the first end positioned near the top end of the relay section, the first end further including a reset hole formed thereon, aligned with the access hole, and adapted to allow a relay reset tool to be disposed therein for urging the first rod towards the top end of the relay section, the second end having a detent formed thereon, a first spring disposed about the first end of the first rod for urging the rod away from the top end of the relay section, a first solenoid wire having a first end, a second end with an integral ground pad extending therefrom, and an intermediate portion therebetween, the first end coupled to the top end of the relay section, the intermediate portion extended around the second end of the first rod, the ground pad extended into the core, and the second end coupled to the bottom end of the relay section, a second solenoid wire having a first end coupled to the top end of the relay section, a second end coupled to the bottom end of the relay section, and an intermediate portion extended therebetween, and a contact strip having a ground pad on one end extended into the core and positioned adjacent to the ground pad of the first solenoid wire, a ground contact on the other end coupled to the bottom end of the relay section, and a contact spring disposed therebetween for urging the contact strip towards the detent of the first rod. The valve section has a top end, a bottom end, and hollow core therebetween, a biasing hole disposed on the bottom end of the valve section for allowing access to a channel between the first port and the second port, a second solenoid slidably disposed therein, the second solenoid including a second rod having a first end, a second end, and an outwardly extending intermediate portion therebetween, the first end positioned near the top end of the valve section and axially aligned with the first rod, the second end extended through the biasing hole into the channel of the body, a second spring disposed about the second end of the second rod for urging the second end of the rod through the biasing hole and into a channel between the first port and the second port, a third solenoid wire having a first end, a second end, and an intermediate portion therebetween, the first end coupled to the top end of the valve section, the intermediate portion extended around the second end of the second rod, and the second end coupled to the top end of the valve section, and a ground wire having a first end coupled to the top end of the valve section and a ground extended therefrom. The first solenoid wire, the third solenoid wire, and the second solenoid wire are coupled together end to end to define an activation lead having an integral input terminal near the top end of the relay section. The contact strip and ground wire are coupled together end to end to define a ground lead. An elongated and T-shaped relay reset tool having a detent on one end and a handle on the other end is included. When the first rod is urged toward the top end of the relay section with the relay reset tool and the power source is activated, the activation lead is terminated against the ground lead to hold the first solenoid near the top end of the relay section, and the second end of the second solenoid is urged into the channel to prevent communication between the first and second port, thus locking the brakes of a vehicle. When the detent of the first rod is urged against the ground lead and the power source is activated, the activation lead is activated and the second solenoid is urged toward the relay section, thus opening the channel to allow communication between the first and second ports, thus unlocking the brakes. A key activation circuit is included and is coupled between the power source and the input terminal of the solenoid relay-valve. The key activation circuit has one orientation for energizing the solenoid relay-valve, thus unlocking the brakes, and another orientation for deenergizing the solenoid relay-valve, thus locking the brakes. The key activation circuit comprises a key slot having a pair of slidable tumblers extended therein, a pair of contacts, each contact positioned near the key slot adjacent to a tumbler and connected to the activation lead, the tumblers having one orientation to abut the contacts and activate the circuit when the proper key is inserted into the key slot and another orientation to deactivate the circuit when the key is removed, and a light source coupled to the activation lead, the light source enabled when the activation circuit is energized.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved security brake system which has all the advantages of the prior art security systems and none of the disadvantages.

It is another object of the present invention to provide a new and improved security brake system which may be easily and efficiently manufactured and marketed.

It is a further object of the present invention to provide a new and improved security brake system which is of durable and reliable construction.

An even further object of the present invention is to provide a new and improved security brake system which is susceptible of a low cost of manufacture with regard to both materials and labor, and which accordingly is then susceptible of low prices of sale to the consuming public, thereby making such a security brake system economically available to the buying public.

Still yet another object of the present invention is to provide a new and improved security brake system which provides in the apparatuses and methods of the prior art some of the advantages thereof, while simultaneously overcoming some of the disadvantages normally associated therewith.

Even still another object of the present invention is to provide a new and improved security brake system for locking and unlocking the brakes on a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the relay and valve sections of the solenoid relay-valve.

FIG. 4 is a view of the relay section of the solenoid realy-valve taken along the line 4—4 of FIG. 3.

FIG. 5 is a cross sectional view depicting the valve body in a normal driving mode with the solenoid energized with the system deactivated. The valve section is closed. The brakes operate as normal. The dark areas within the channels indicate brake pressure. The light areas within the channels indicate no brake pressure.

FIG. 6 is a cross sectional view depicting the valve body in an anti-theft mode with the solenoid de-egnergized with the system activated. The brakes are locked. The valve section is opened. The dark areas within the channels indicate brake pressure. The light areas within the channels indicate no brake pressure.

FIG. 7 is a cross sectional view depicting the relay reset tool used to manually close the solenoid to arm the system.

FIG. 8 is a perspective view of the relay reset tool of the present invention.

FIG. 9 is a schematic diagram of the timing circuit used with the key activation circuit in an alternate embodiment of the present invention.

The same reference numerals refer to the same parts through the various Figures.

DESCRIPTION OF THE PREFERRED EMBODIMENT

Figure 1:
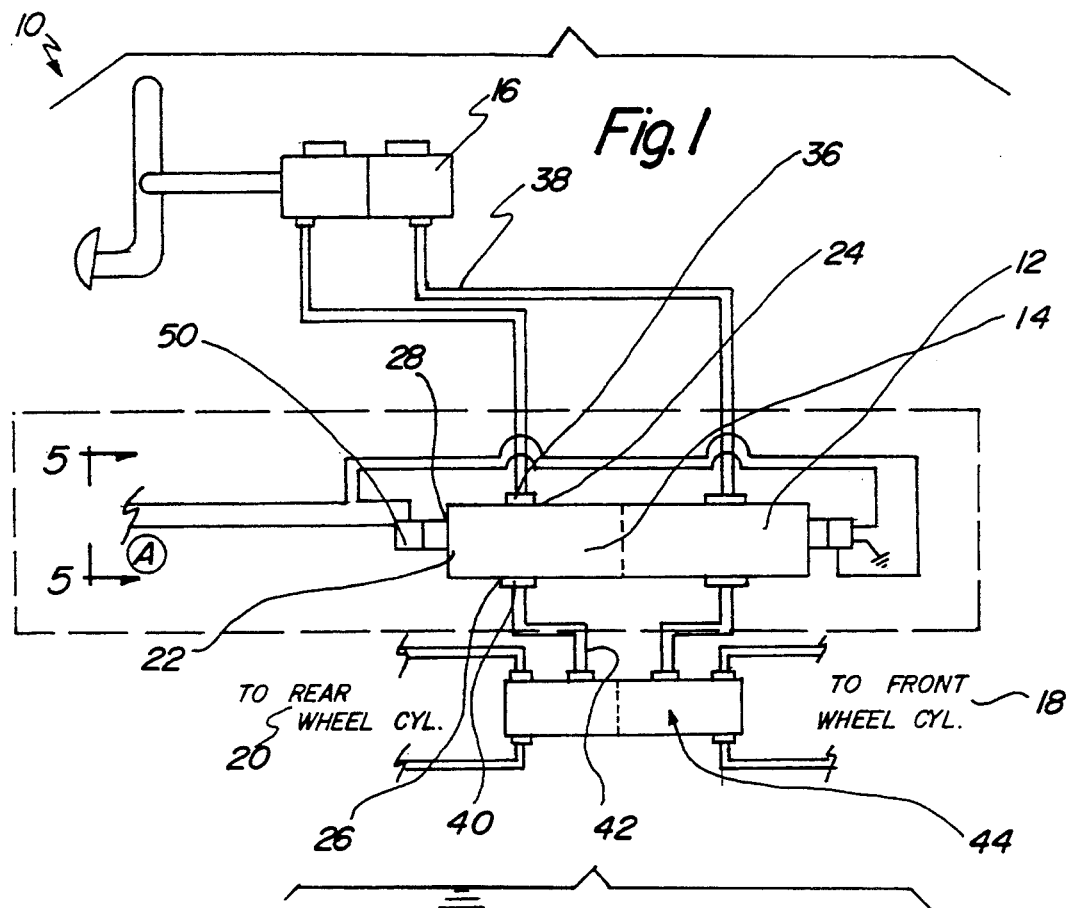
FIG. 1 is a plan view of the preferred embodiment of the security brake system constructed in accordance with the principles of the present invention in operation with a braking system of a vehicle.
Figure 2:
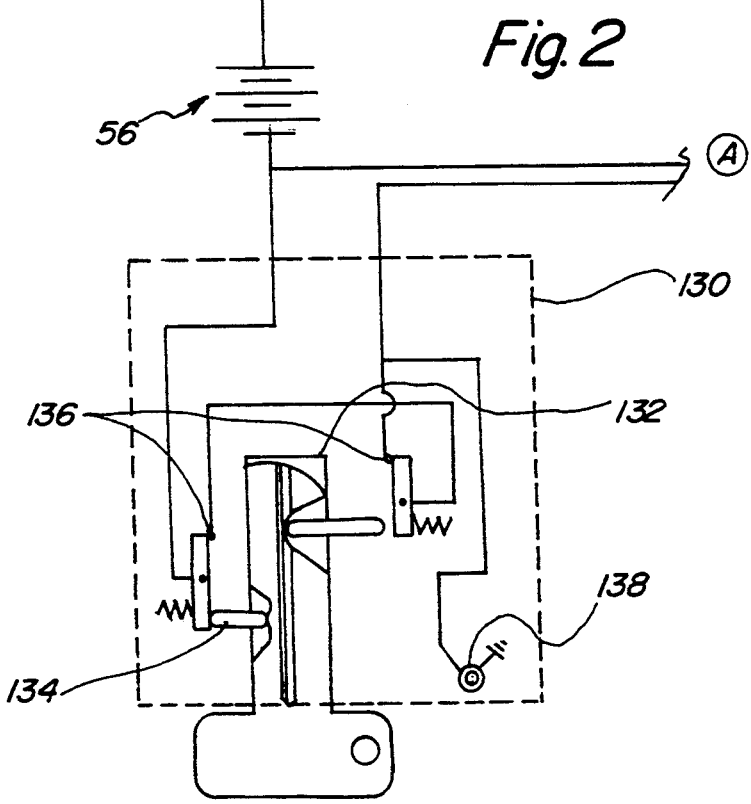
FIG. 2 is a schematic diagram of the circuitry of the key activation circuit used to activate or deactivate the solenoid realy-valve on the valve body.

With reference now to the drawings, and in particular, to FIG. 1 thereof, the preferred embodiment of the new and improved security brake system embodying the principles and concepts of the present invention and generally designated by the reference number 10 will be described.

Specifically, the present invention includes three major components. The major components are the braking modules, the activation circuit, and the relay reset tool. These components are interrelated to provide the intended function.

More specifically, it will be noted in the various Figures that the first major component is the braking module. The security brake system includes a first braking module 12 and a second braking module 14. The first braking module is adapted to be coupled between the brake master cylinder 16 and the front set of wheel cylinders 18 of a vehicle. The second braking module is adapted to be coupled between the brake master cylinder and the rear set of wheel cylinders 20 of a vehicle.

The braking module includes several subcomponents. The first subcomponent is the rigid body 22. The body has a threaded first port 24 disposed thereon. The body has a threaded second port 26 disposed thereon. The body also includes a threaded third port 28 disposed thereon. The body has a plurality of channels 30 disposed therein between the ports. The ports are connected at a common juncture. The reservoir 32 is formed at the juncture. A one-way check valve 34 is disposed within the reservoir. The first port of the body has a first ring 36 threadably coupled therein. The first ring is adapted to be coupled to a brake line 38 for allowing the transfer of braking pressure from a brake master cylinder 16. The second port of the body has a second ring 40 threadably coupled therein. The second ring is adapted to be connected to a brake line 42 for allowing the transfer of braking pressure to a differential pressure valve 44. This differential pressure valve provides braking pressure to a set of wheel cylinders. The third port 28 is adapted to receive a solenoid relay-valve therein, with the solenoid relay-valve secured with a locking pin 46. The channels 30 and the reservoir 32 of the body are adapted for transferring brake pressure therethrough to the between the first port 24 and the second port 26. The one-way check valve is adapted for maintaining and controlling the brake pressure within the reservoir. The check valve is adapted to slide within the reservoir based on the pressure therein having a spring 01 to urge the valve to the closed position.

The second subcomponent of the module is an elongated solenoid relay-valve 50. The solenoid relay-valve has a tubular relay section 52 threadably coupled to a tubular valve section 54. The relay section is adapted to be coupled to a power source 56. The valve section is threadably coupled to the third port 28 of the body. A portion of the valve section extends within the channel between the first port 24 and the second port 26. This portion of the valve section is adapted to control the brake pressure between the first and the second port, whereby allowing the brakes to be locked or unlocked.

Furthermore, with respect to the solenoid relay-valve, the relay section 52 has a top end 58, a sealed bottom end 60, and a hollow core 62 disposed therebetween. The relay section includes an access hole 64 disposed on the top end 58 of the relay section for allowing access to the core 62. The relay section includes a first solenoid 65 slidably disposed therein.

Furthermore, with respect to the relay section of the solenoid relay-valve, the first solenoid includes a first rod 66 having a first end 68, a second end 70, and an outwardly extending intermediate portion 72 therebetween. The first end of the first solenoid is positioned near the top end 58 of the relay section. The first end further includes a reset hole 74 formed thereon and aligned with the access hole 64. The reset hole is adapted for allowing a relay reset tool to be disposed therein for urging the first rod 66 towards the top end of the relay section. The second end of the first rod has a detent 76 formed thereon. The first solenoid includes a first spring 78 disposed about the first end 68 of the first rod. The spring is used to urge the rod away from the top end of the relay section.

The first solenoid includes several electrical conduction members. The first solenoid includes a first solenoid wire 80. The first solenoid wire has a first end, a second end with an integral ground pad 82 extended therefrom and an intermediate portion therebetween. The first end of the wire is coupled to the top end 58 of the relay section. The intermediate portion of the wire is extended around the second end 70 of the first rod. The ground pad is extended into the core 62. The second end of the wire is coupled to the bottom end 60 of the relay section. The first solenoid includes a second solenoid wire 84. The second solenoid wire has a first end coupled to the top end 58 of the relay section, a second end coupled to the bottom end 60 of the relay section, and an intermediate portion extended therebetween. The first solenoid also includes a contact strip 86. The contact strip has a ground pad 88 on one end extended into the core 62 and positioned adjacent to the ground pad 82 of the first solenoid wire. The contact strip has a ground contact 90 disposed on the other end.

The ground contact is coupled to the bottom end 60 of the relay section. A contact spring 92 urges the contact strip towards the detent 76 of the second end 70 of the first rod.

Furthermore, with respect to the solenoid relay-valve, the valve section 54 has a top end 94, a bottom end 96, and a hollow core 98 therebetween. A biasing hole 100 is disposed on the bottom end 96 of the valve section. The biasing hole allows access to a channel 30 within the body between the first port 24 and the second port 26.

The valve section also includes a second solenoid 102. The second solenoid is slidably disposed within the valve section. The second solenoid includes a second rod 104. The second rod has a first end 106, a second end 108, and an outwardly extending intermediate portion 110 therebetween. The first end of the second rod is positioned near the top end 94 of the valve section. It is axially aligned with the first rod 66. The second end of the rod is extended through the biasing hole 100 and into the channel 30 of the body between the first port 24 and the second port 26. The second spring 112 is disposed around the first end 106 of the second rod. The spring is used for urging the second end of the rod through the biasing hole and into the channel.

The second solenoid includes several electrical conduction members. The second solenoid includes a third solenoid wire 114. The solenoid wire has a first end, a second end, and an intermediate portion therebetween. The first end is coupled to the top end 94 of the valve section. The intermediate portion extends around the second end 108 of the second rod. The second end of the wire is coupled to the top end 94 of the valve section. The second solenoid also includes a ground wire 116. The ground wire has a first end coupled to the top end 94 of the valve section and a ground 118 extended therefrom.

The first solenoid wire 80, the third solenoid wire 114, and the second solenoid wire 84 are coupled together end to end to define an activation lead 120. The lead has an integral input terminal 122. The contact strip 86 and ground wire 116 are coupled together end to end to define a ground lead 124.

In one mode of operation, the first rod 66 is urged toward the top end 58 of the relay section. The power source 56 is then activated. Once the rod is urged back towards the top end, the activation lead 120 is thus terminated against the ground lead 124. The first solenoid 64 is then electrically coupled near the top end of the relay section. The second spring thus urges the second end 108 of the second solenoid into the channel 30 of the body to prevent communication between the first port 24 and the second port 26. This action thereby locks the brakes of a vehicle. In another mode of operation, the detent 76 of the first rod is urged against the ground lead 124. The power source 56 is then activated. The activation lead 120 is thereby activated throughout its entire extent, and a second solenoid 102 is urged toward the relay section. This action opens the channel 30 to allow communication between the first port 24 and the second port 26. This action thereby unlocks the brakes on a vehicle.

The second major component is the key activation circuit 130. The key activation circuit is coupled between the power source 56 and the input terminal 122 of the solenoid relay-valve. The key activation circuit has one orientation for energizing the solenoid valve, thus unlocking the brakes. The key activation circuit has another orientation for de-energizing the solenoid relay-valve, thus locking the brakes.

The key activation circuit has several subcomponents. The first subcomponent is a key slot 132. The key slot has a pair of slidable tumblers 134 extended therein. The second subcomponent is a pair of contacts 136. Each contact is positioned near the key slot adjacent to a tumbler and connected to the activation lead 120. The tumblers have one orientation adapted to abut the contacts and activate the circuit when the proper key is inserted into the key slot. The contacts have another orientation to deactivate the circuit when the key is removed.

The third subcomponent of the key activation circuit is a light source 138. The light source is coupled to the activation lead. The light source is enabled when the activation circuit is energized.

The third major component is an elongated and T-shaped relay reset tool 140. The reset tool has a detent 142 on one end. The reset tool has a handle 144 on the other end. The detent of the reset tool is adapted to be disposed within the reset hole 74 of the first solenoid in order to urge the first solenoid towards the top end 58 of the relay section in order to place the system in an armed configuration.

A second embodiment of the present invention includes substantially all the components of the first embodiment further including the timer circuit of FIG. 9. The timer circuit is coupled between the key activation circuit 130 and the relay section 52 of the solenoid relay valve. The timer circuit is adapted to delay the activation or de-activation of the solenoid relay-valve when power is applied or removed through the insertion or removal of the key within the key activation circuit.

To arm the security system, the tamper proof relay must be manually closed. This manual closing allows the contact points between the activation lead and the ground lead to close, thus making the ground. At this point, power may be applied, thus holding the relay closed, which now provides a ground for the solenoid relay-valve of the relay through the contact points. After this, any interruption of power will break the ground which will cause the spring loaded solenoid relay-valve to close and become inoperative, thus arming the system. The system can not be hot wired because the circuit has no ground. With the ground made, the solenoid relay-valve will be controlled by insertion of a key or card within the key slot.

In the preferred mode of operation, the device is used as a vehicle security system that locks the brakes of a vehicle when the owner leaves the vehicle. It is a fail safe system in that the system is armed automatically widen a unique key or card is removed from the slot. This key or card slot is independent of the ignition switch and is in no way connected. It is also tamper proof in that the electrical components are designed so that the primary power only powers the system off. Any interruption of power will arm the system and will require the relay reset tool to disarm it. In this way, any tampering with the system will arm it. While the system is armed, any brake application will lock the brakes and they will not be released unless or until the key or card is inserted. It is intended that prior to leaving the vehicle, the owner would remove the key or card and make a single brake application to lock the brakes. Upon re-entry he or she would insert the unique key or card in the slot which will de-energize the system for normal driving. Even if the owner did not set the brakes prior to leaving the vehicle, any subsequent brake application with the key or card removed will lock the brakes. When the system is armed and the brakes are applied, they will operate normally during application, but the brake pressure will not be released upon brake pedal release and the brakes will remain locked.

In the preferred embodiment, the valve body has dimensions of four inches by eight inches by one and one half inches. The power source is a 12-volt DC battery. The device is installed between the brake master cylinder and proportioning valve or differential pressure valve. Non-standard threads are used to prevent installation of standard pipe plugs or ports to defeat the system. The 12-volt DC battery is used to energize or de-energize the solenoid relay-valve. The tamper proof relay is an integral part of the solenoid relay-valve. Any interruption of power will break ground, and the solenoid, which is spring loaded, will not open, thus arming the system. The device employs a two wire molded cable system. The molded cable system also called "wire within a wire", is used to prevent cutting of the inner wire without cutting the outer wire which will energize the system by breaking ground to 12 volt DC. The device is intended to be installed inside the dash of an vehicle or other hidden location. The system is powered to the off position to conserve battery power. When the vehicle is not in use and the generator is not charging, the battery of the system will be on when the vehicle is idle or off when the vehicle is in use.

An alternate embodiment of the present invention includes substantially all of the components of the first embodiment further including a foot switch coupled to the input terminal for activating and deactivating the system. The foot switch would be mounted on the floor of the vehicle and concealed under the carpet. The foot switch is connected to the input terminal 122. In normal driving circumstances the security brake system would be de-energized, with unique key or card inserted into the key slot for normal operation. In the event of a hi-jacking, a touch of the foot switch (which could be done without conspicuous movement) would activate the timer control relay and turn the timer on. The timer is used to allow the owner to exit the vehicle and get to safety. The timer would be set for a three or four minute duration. After this time any subsequent brake application would lock the brakes and limit the time and distance the vehicle could be driven.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

I claim:

1. A security brake system for locking and unlocking brakes of a vehicle comprising, in combination:

first and second braking modules, with each braking module further comprising:

a rigid body having a first port disposed thereon, a second port disposed thereon, a third port disposed thereon, at least one channel extended from each port with said channels joined within said body at a common juncture for allowing communication therebetween, a reservoir formed at said juncture, and a one way check valve disposed within said reservoir, said first port allowing transfer of braking pressure to said body, said second port allowing transfer of braking pressure from said body, said channels and said reservoir allowing transfer of braking pressure through said body between said ports, and said one way check valve maintaining and controlling braking pressure within said reservoir;

an elongated solenoid relay-valve having a tubular relay section threadably coupled to a tubular valve section, said valve section coupled to said third port of said body and extended within one of said channels between said first port and said second port for controlling braking pressure therebetween, whereby allowing said brakes of said vehicle to be locked and unlocked, said relay section further having:

a top end, a sealed bottom end, and a hollow core therein, an access hole disposed on said top end for allowing access to said core, a first solenoid slidably disposed within said core, said first solenoid including a first rod having a first end, a second end, and an outwardly extending intermediate portion therebetween, said first end positioned near said top end and further including a reset hole formed thereon at a location aligned with said access hole, said second end having a detent formed thereon, a first spring disposed about said first end of said first rod for urging said first rod away from said top end, a first solenoid wire having a first end extended through said top end and a second end coupled to said bottom end with an integral ground pad extending therefrom into said core, and an intermediate portion therebetween extended around said second end of said first rod, a second solenoid wire having a first end extended through said top end, a second end coupled to said bottom end, and an intermediate portion extended therebetween, an elongated contact strip having a ground pad on one end extended into said core and positioned adjacent to said ground pad of said first solenoid wire and a ground contact on the other end coupled to said bottom end, and a contact spring for urging said contact strip towards said detent of said first rod;

said valve section further having:

a top end, a bottom end, and a hollow core therein, a biasing hole disposed on said bottom end of said valve section for allowing access to one of said channels between said first port and said second port, a second solenoid slidably disposed within said core and including a second rod having a first end positioned facing said top end of said valve section and axially aligned with said first rod of said relay section, a second end extended through said biasing hole and into one of said channels of said body, and an outwardly extending intermediate portion therebetween, a second spring disposed about said first end of said second rod for urging said second end of said second rod through said biasing hole and into one of said channels between said first port and said second port, a third solenoid wire having a first end coupled to said top end thereof, a second end coupled to said top end thereof, and an intermediate portion therebetween extended around said first end of said second rod, and a ground wire having a first end coupled to said top end thereof with a ground extended therefrom;

with said first solenoid wire, said third solenoid wire, and said second solenoid wire coupled together end to end to define an activation lead having an integral input terminal and with said contact strip and said ground wire coupled together end to end to define a ground lead;

whereby when said first rod is urged toward said top end of said relay section and energized, said activation lead is terminated against said ground lead to hold said first solenoid near said top end of said relay section, thus urging said second end of said second solenoid into one of said channels for preventing communication between said first port and said second port, thus locking said brakes of said vehicle, and when said detent of said first rod is urged against said ground lead and energized, said activation lead is activated and said second solenoid is urged toward said relay section, thus opening one of said channels for allowing communication between said first port and said second port, thus unlocking said brakes of said vehicle;

a key activation circuit having one orientation for energizing said solenoid relay-valve, thus unlocking said brakes of said vehicle, and another orientation for de-energizing said solenoid relay-valve, thus locking said brakes of said vehicle, said key activation circuit further comprising a key slot having a pair of slidable tumblers extended therein, a pair of contacts with each contact positioned near said key slot adjacent to one of said tumblers and connected to said activation lead, said tumblers having one orientation for abutting said contacts for activating said activation circuit when a proper key is inserted into said key slot and another orientation for deactivating said activation circuit when said key is removed, and a light source coupled to said activation lead for providing a visual indication of when said activation circuit is energized; and an elongated and T-shaped relay reset tool having a detent on one end and a handle on the other end, whereby when said detent is secured within said reset hole of said relay section and said handle thereof is pulled, said first end of said first rod is urged towards said top end of said relay section to place said security brake system in an armed configuration.

2. A security brake system for locking and unlocking brakes of a vehicle comprising:

a plurality of braking modules, each braking module further comprising a body having a first port, a second port, a third port, and at least one channel extended from each port within said body with said channels meeting at a common juncture for allowing communication therebetween, said first port allowing transfer of braking pressure to the body, said second port allowing transfer of braking pressure from the body, said channels allowing transfer of braking pressure through the body between said ports;

valve means coupled to said third port and extended within one of said channels between said first port and said second port for controlling brake pressure, whereby allowing said brakes of said vehicle to be locked or unlocked; and key-receivable activation means for activating said valve means in one orientation upon receipt of a proper key, whereby unlocking said brakes of said vehicle, and deactivating said valve means in another orientation upon removal of said key, whereby locking said brakes of said vehicle;

indication means for indicating when said valve means are activated or deactivated;

timing means coupled to said key-receivable activation means for allowing the activation or deactivation of said valve means within a given period of time; and a foot switch coupled to said key-receivable activation means and overriding operation of said key-receivable activation means for activating or deactivating said valve means.

* * * * *